(12) United States Patent
You (10) Patent No.: US 10,840,485 B2
(45) Date of Patent: Nov. 17, 2020

(54) COMPOSITE END PLATE AND BATTERY MODULE

(71) Applicant: Contemporary Amperex Technology Co., Limited, Ningde (CN)

(72) Inventor: Shubing You, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 146 days.

(21) Appl. No.: 16/227,214

(22) Filed: Dec. 20, 2018

(65) Prior Publication Data

US 2019/0207177 A1 Jul. 4, 2019

(30) Foreign Application Priority Data

Dec. 29, 2017 (CN) .......................... 2017 1 1479942

(51) Int. Cl.
*H01M 2/10* (2006.01)
*H01M 10/04* (2006.01)

(52) U.S. Cl.
CPC ....... *H01M 2/1077* (2013.01); *H01M 2/1061* (2013.01); *H01M 10/0481* (2013.01)

(58) Field of Classification Search
CPC ............. H01M 2/1061; H01M 2/1072; H01M 2/1077; H01M 10/0481
See application file for complete search history.

(56) References Cited

U.S. PATENT DOCUMENTS

| | | | |
|---|---|---|---|
| 2015/0140406 A1 | 5/2015 | Kim et al. | |
| 2015/0295214 A1* | 10/2015 | Cho | H01M 2/206 429/121 |

FOREIGN PATENT DOCUMENTS

| | | | |
|---|---|---|---|
| CN | 205790141 U | 12/2016 | |
| CN | 106299187 | * | 1/2017 |
| CN | 106299187 A | 1/2017 | |
| CN | 106356565 A | 1/2017 | |
| CN | 106654103 A | 5/2017 | |
| CN | 206250253 U | 6/2017 | |
| CN | 107046115 A | 8/2017 | |
| CN | 206727139 U | 12/2017 | |
| EP | 2874201 A1 | 5/2015 | |
| EP | 3236510 A1 | 10/2017 | |
| EP | 3352245 A1 | 7/2018 | |

OTHER PUBLICATIONS

Machine translation of the abstract of CN 106299187, published on Jan. 4, 2017 (Year: 2017).*
Machine translation of the description of CN 106299187, published on Jan. 4, 2017 (Year: 2017).*
Machine translation of the claims of CN 106299187, published on Jan. 4, 2017 (Year: 2017).*
Machine translation of the description of CN 205790141, published on Dec. 7, 2016 (Year: 2016).*
Machine translation of the description of CN 206250253, published on Jun. 13, 2017 (Year: 2017).*
Machine translation of the description of CN 206727139, published on Dec. 8, 2017 (Year: 2017).*
Machine translation of the description of CN 107046115, published on Aug. 15, 2017 (Year: 2017).*
The extended European search report dated Apr. 25, 2019 for European Application No. 18215095.3, 9 pages.
The first Office Action and search report for Chinese Application No. 201711479942,2, dated Sep. 3, 2020, 13 pages.

* cited by examiner

*Primary Examiner* — Anca Eoff
(74) *Attorney, Agent, or Firm* — Law Offices of Liaoteng Wang (57) ABSTRACT

The present disclosure relates to a composite end plate and a battery module. The composite end plate comprises a first rigid plate having a first surface and a second surface opposite to each other in a thickness direction of the first rigid plate, and comprising a first end portion, a first intermediate portion and a second end portion continuously distributed in a length direction of the first rigid plate; and a second rigid plate comprising a first free end, a second intermediate portion and a second free end continuously distributed in the length direction, wherein the first rigid plate and the second rigid plate are made of different materials, the second intermediate portion is disposed opposite to the first surface, the first free end is connected to the first end portion, and the second free end is connected to the second end portion.

9 Claims, 9 Drawing Sheets

COMPOSITE END PLATE AND BATTERY MODULE

CROSS REFERENCE TO RELATED APPLICATION

This application claims priority to Chinese Patent Application No. 201711479942.2, filed on Dec. 29, 2017, which is hereby incorporated by reference in its entirety.

TECHNICAL FIELD

The present disclosure relates to a technical filed of battery, and particularly to a composite end plate and a battery module.

BACKGROUND

With the development of technology, power battery applications are becoming more and more extensive, involving production or life. The power battery is also called a secondary battery and can be a rechargeable battery. The power battery is widely used. The power battery of low capacity can be used in small electric vehicles, and the power battery of high capacity can be used in large electric vehicles such as hybrid or electric vehicles. When power batteries are used in groups, it is necessary to use a bus bar to connect the power batteries together in series or in parallel. Usually, the bus bar is welded to positive and negative terminals of the power battery. Each power battery includes a plurality of battery modules. Each battery module includes a plurality of unit cells and end plates and side plates for fixing the plurality of unit cells. The end plates and side plates are arranged to surround all of the unit cells. In the prior art, the end plate is formed as an integral member. Both the end plate and the side plate are made of aluminum. The end plate and the side plate are fixedly assembled by welding. As the capacity of the battery module continues to increase, the unit cell may expand in some cases, thereby applying an expansion force to the end plate and the side plate, which causes the end plate and the side plate to tend to deform and displace, and thus resulting a failure of the weld joint between the side plate and the end plate fails. Therefore, the conventional battery module has a problem of low structural strength.

SUMMARY

The embodiments of the present disclosure provide a composite end plate and a battery module, wherein when applied to the battery module, the composite end plate can understand a larger expansion deformation force from the unit cells, improving a structural reliability of the battery module as a whole.

On one aspect, the embodiments of the present disclosure provides a composite end plate for a battery module, wherein the composite end plate comprises: a first rigid plate having a first surface and a second surface opposite to each other in a thickness direction of the first rigid plate, and comprising a first end portion, a first intermediate portion and a second end portion continuously distributed in a length direction of the first rigid plate; and a second rigid plate comprising a first free end, a second intermediate portion and a second free end continuously distributed in the length direction, wherein the first rigid plate and the second rigid plate are made of different materials, the second intermediate portion is disposed opposite to the first surface, the first free end is connected to the first end portion, and the second free end is connected to the second end portion.

According to one embodiment of the present disclosure, the first rigid plate and the second rigid plate are made of metal material; or the first rigid plate is made of a non-metal material, and the second rigid plate is made of a metal material.

According to one embodiment of the present disclosure, the first intermediate portion and the second intermediate portion are spaced apart from each other with a buffer gap formed therebetween.

According to one embodiment of the present disclosure, the first free end is folded to the second surface to enclose the first end portion, and the second free end is folded to the second surface to enclose the second end portion.

According to one embodiment of the present disclosure, the first end portion is provided with a first positioning groove on the same side with the second surface, and the first positioning groove is adapted to receive an edge portion of the first free end.

According to one embodiment of the present disclosure, the composite end plate further comprises a first connecting member, through which the first free end is connected to the first end portion.

According to one embodiment of the present disclosure, the edge portion of the first free end is provided with a first positioning hole, and the first connecting member is formed as a first positioning post, wherein a portion of the first positioning post is inserted into the first positioning hole to fixedly connect the first free end and the first end portion to each other.

According to one embodiment of the present disclosure, the first positioning post is formed by a portion of the first end portion that protrudes towards the first positioning groove.

According to one embodiment of the present disclosure, the second end portion is provided with a second positioning groove on the same side with the second surface and the second positioning groove is adapted to receive an edge portion of the second free end.

According to one embodiment of the present disclosure, the composite end plate further comprises a second connecting member, through which the second free end is connected to the second end portion.

According to one embodiment of the present disclosure, the edge portion of the second free end is provided with a second positioning hole, and the second connecting member is formed as a second positioning post, wherein a portion of the second positioning post is inserted into the second positioning hole to fixedly connect the second free end and the second end portion to each other.

According to one embodiment of the present disclosure, the second positioning post is formed by a portion of the second end portion that protrudes towards the second positioning groove.

According to one embodiment of the present disclosure, the composite end plate is provided with a guiding member adapted to play a guiding role during assembly of the first rigid plate and the second rigid plate.

According to one embodiment of the present disclosure, the guiding member is formed of a guiding groove and a guiding rib extending in a width direction of the first rigid plate, and one of the guiding groove and the guiding rib is disposed on the first rigid plate and the other one is disposed on the second rigid plate.

According to one embodiment of the present disclosure, the guiding groove comprises a bottom surface and a positioning recess provided on the bottom surface, and the guiding rib comprises a top surface and a positioning protrusion provided on the top surface, wherein at least a portion of the positioning protrusion is inserted into the positioning recess.

According to one embodiment of the present disclosure, the positioning recess has a polygonal cross portion, and outer peripheral surfaces of the portion of the positioning protrusion inserted into the positioning recess are contact with inner wall surfaces of the positioning recess.

According to one embodiment of the present disclosure, the guiding member is disposed both between the first free end and the first end portion and between the second free end and the second end portion.

The composite end plate according to the embodiments of the present disclosure comprises a first rigid plate and a second rigid plate made of different materials. When the composite end plate is applied to the battery module, the second rigid plate is used to fixedly connect with the side plate. The second rigid plate and the side plate can be made of the same material and can be joined to each other by welding. As a result, a weld joint between the second rigid plate and the side plate has a high strength and an improved tensile stress resistance, so that the composite end plate can withstand a larger expansion deformation force from unit cells, and a structural reliability of the battery module as a whole can be improved.

On another aspect, the embodiments of the present disclosure provide a battery module, comprising: a plurality of unit cells arranged side by side; and a fixing frame, arranged to surround an outer periphery of all the unit cells and comprising two composite end plates as described above and two side plates, wherein the composite end plates and the side plates are alternately arranged around the plurality of the unit cells and are connected to each other, and the side plates are made of the same material as the second rigid plate.

BRIEF DESCRIPTION OF THE DRAWINGS

Features, advantages, and technical effects of exemplary embodiments of the present disclosure will be described below with reference to accompanying drawings.

In the drawings, the drawings are not drawn to scale.

DESCRIPTION OF REFERENCE SIGNS 1 composite end plate;
11 first rigid plate;
11a first surface;
11b second surface;
111 first end portion;
111a first positioning groove;
112 first intermediate portion;
113 second end portion;
113a second positioning groove;
114 through hole;
115 guiding groove;
115a positioning recess;
12 second rigid plate;
121 first free end;
121a first positioning hole;
122 second intermediate portion;
123 second free end;
123a second positioning hole;
124 guiding rib;
124a positioning protrusion;
2 side plate;
3 first connecting member;
4 second connecting member;
99 buffer gap;
X thickness direction;
Y length direction;
Z width direction.

DETAILED DESCRIPTION

Below, embodiments of the present disclosure will be further described in detail with reference to the drawings and embodiments. The detailed description of the embodiments and the accompanying drawings are intended to exemplary illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", and the like are used for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

For better understanding the present disclosure, a composite end plate 1 according to the embodiments of the present disclosure will be described in detail below by reference to FIG. 1 to FIG. 9.

Figure 1:
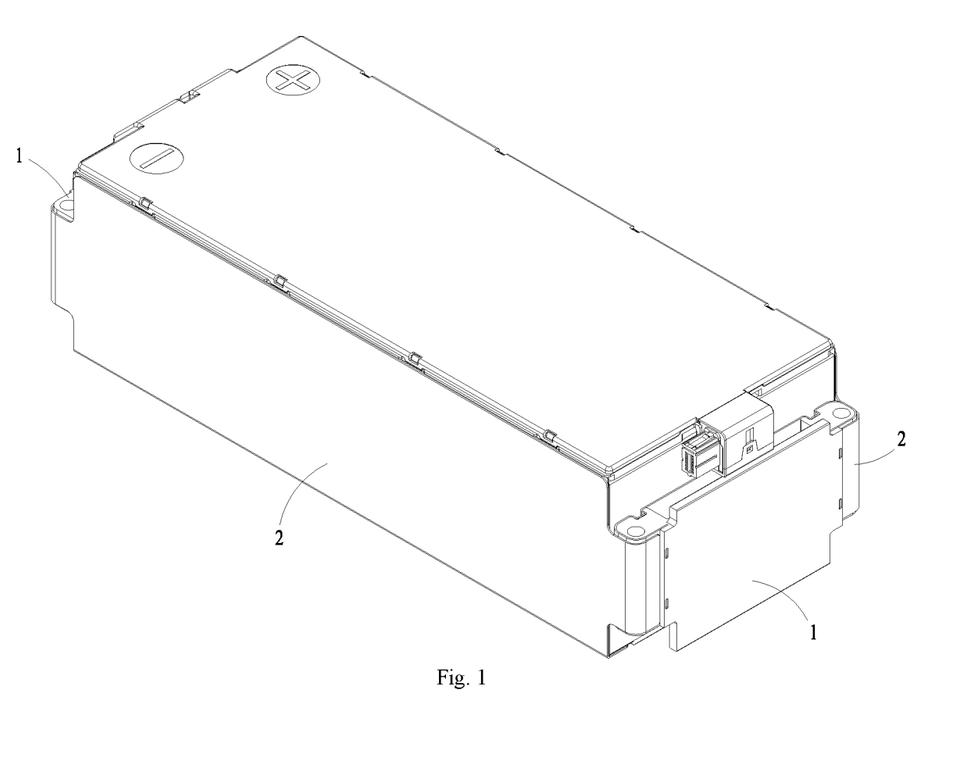
FIG. 1 is a schematic view showing a configuration of a battery module comprising a composite end plate according to one embodiment of the present disclosure.

FIG. 1 schematically shows a configuration of a battery module applied with the composite end plate 1 of the present embodiment. As shown in FIG. 1, the composite end plate 1 according to embodiments of the present disclosure is applied to a battery module. The battery module of the present embodiment includes a plurality of unit cells arranged in one direction, two composite end plates 1 according to the embodiments of the present disclosure, and two side plates 2. An assembly is formed by the plurality of unit cells. The two composite end plates 1 are respectively disposed on opposite sides of the assembly in the arrangement direction of the unit cells. The two side plates 2 are disposed apart from each other in a direction perpendicular to the arrangement direction of the unit cells, and are individually connected to the two composite end plates 1. The two composite end plates 1 and the two side plates 2 form a fixing frame together for fixing the plurality of unit cells.

Figure 2:
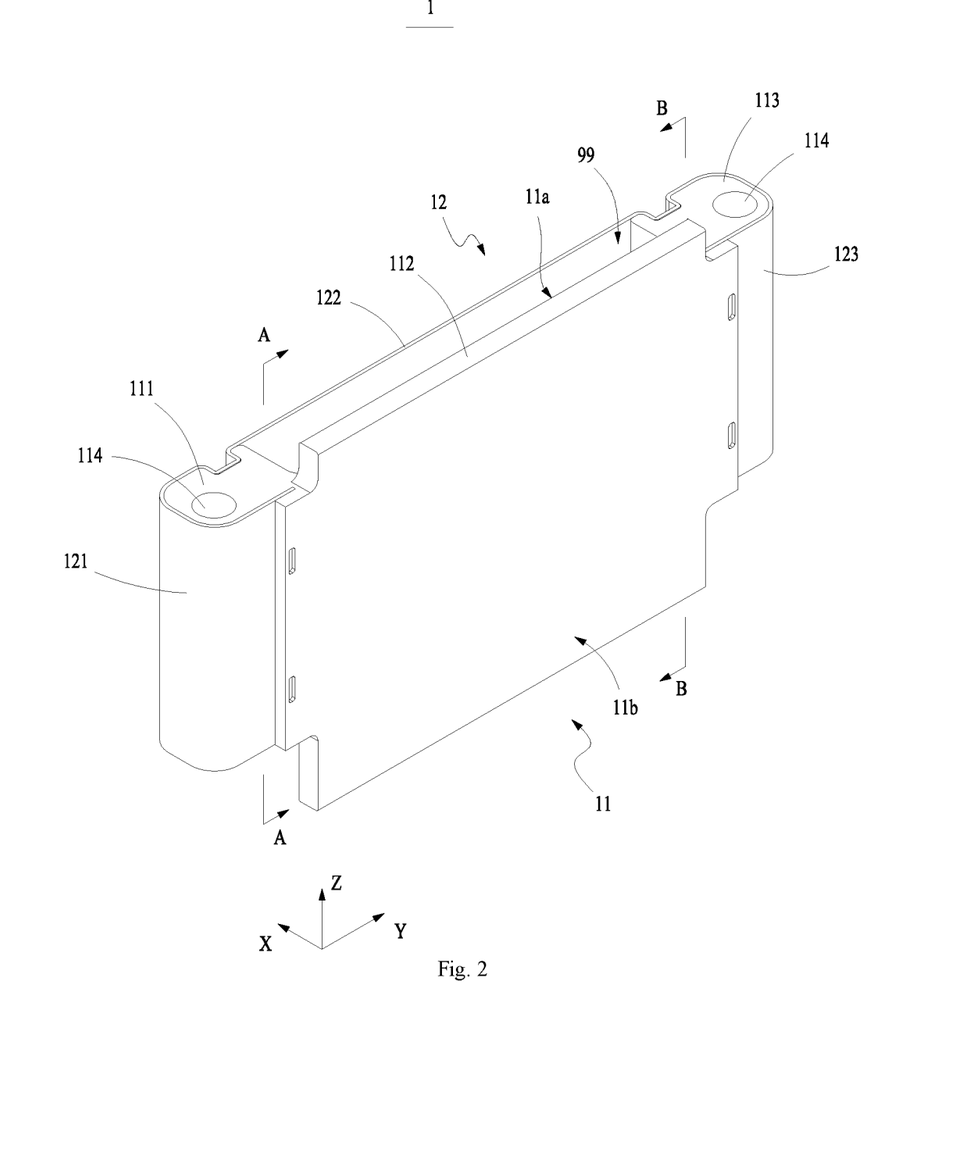
FIG. 2 is a schematic view showing a configuration of a composite end plate according to one embodiment of the present disclosure.

FIG. 2 schematically shows a configuration of the composite end plate 1 according to one embodiment of the present disclosure. As shown in FIG. 2, the composite end plate 1 according to the embodiment of the present disclosure includes a first rigid plate 11 and a second rigid plate 12. The first rigid plate 11 has a predetermined length, width, and thickness. The first rigid plate 11 has a first surface 11a and a second surface 11b opposite to each other in its thickness direction X. The first rigid plate 11 includes a first end portion 111, a first intermediate portion 112, and a second end portion 113 continuously distributed in its length direction Y. The second rigid plate 12 includes a first free end 121, a second intermediate portion 122, and a second free end 123 continuously distributed along the length direction Y of the first rigid plate 11. The first rigid plate 11 and the second rigid plate 12 are made of different materials. Optionally, the first rigid plate 11 and the second rigid plate 12 are made of metal material; or the first rigid plate 11 is made of a non-metal material, and the second rigid plate is made of a metal material. The first rigid plate 11 and the second rigid plate 12 are arranged side by side in the thickness direction X of the first rigid plate 11. The second intermediate portion 122 of the second rigid plate 12 is disposed opposite to the first surface 11a of the first rigid plate 11. The first free end 121 of the second rigid plate 12 is connected to the first end portion 111 of the first rigid plate 11. The second free end 123 of the second rigid plate 12 is connected to the second end portion 113 of the first rigid plate 11.

When the composite end plate 1 according to the embodiment of the present disclosure is applied to a battery module, the second rigid plate 12 of the composite end plate 1 of the present embodiment is disposed adjacent to the unit cells, and used for fixedly connecting with the side plate 2. In the present embodiment, the first free end 121 of the second rigid plate 12 is fixedly connected with one of the side plates 2, and the second free end 123 is fixedly connected with the other side plate 2. The two side plates 2 can simultaneously tension the second rigid plate 12 and a tension force from the two side plates 2 can be transferred to the first rigid plate 11 and the unit cells via the second rigid plate 12. The second rigid plate 12 and the side plate 2 can be made of the same material and can be connected to each other by welding. As a result, a weld joint between the second rigid plate 12 and the side plate 2 can have a high strength and thus an improved tensile stress resistance, so that the composite end plate 1 can withstand a larger expansion deformation force from the unit cells, and structural reliability of the battery module as a whole can be improved.

In the case that an expansion deformation of at least one of the plurality of unit cells occurs, the expansion deformation force is transferred to the second rigid plate 12 and the side plate 2. The structural stability of the battery module as a whole can be ensured by the fixed connection between the second rigid plate 12 and the side plate 2. When the unit cells expand and the expansion deformation force is generated, the two side plates 2 can apply tension forces to the second rigid plate 12 along the length direction Y of the first rigid plate 11, so that the second rigid plate 12 as a whole can apply a compressive stress to the unit cells to counteract the expansion deformation force from the unit cells. As a result, the second rigid plate 12 can be prevented from displacing or deforming away from the unit cells, thereby preventing the composite end plate 1 as a whole from displacing or deforming away from the unit cells.

Since the first rigid plate 11 mainly bears the tensile stress from the side plates 2, the material of the first rigid plate 11 can be selected more flexibly. The first rigid plate 11 may have a density smaller than that of the second rigid plate 12, on the premise that the connection rigidity of the second rigid plate 12 and the side plates 2 made of the same material satisfies requirements. In one embodiment, both of the second rigid plate 12 and the side plates 2 are made of steel, so that the weld joint formed between the second rigid plate 12 and the side plate 2 has a high strength, and thus can withstand a larger force generated by the expansion of the unit cells. In one example, both of the second rigid plate 12 and the side plates 2 are made of stainless steel, resulting in high connection strength and good corrosion resistance. The material of the first rigid plate 11 may be a non-metal material, such as engineering plastic, glass fiber reinforced plastic or carbon fiber, to reduce an overall weight of the composite end plate 1. Meanwhile, the thickness of the first rigid plate 11 can be flexibly set according to actual requirements. In another example, the material of the first rigid plate 11 may be aluminum or aluminum alloy, which is convenient for the first rigid plate 11 to be manufactured by extrusion molding and machining, resulting in a low difficulty and a low cost in processing.

In a width direction Z of the first rigid plate 11, the second rigid plate 12 as a whole may completely cover the first surface 11a of the first rigid plate 11, that is, a width of the second rigid plate 12 is greater than or equal to that of the first rigid plate 11. Alternatively, the second rigid plate 12 as a whole can cover part of the first surface 11a of the first rigid plate 11, that is, the width of the second rigid plate 12 is smaller than that of the first rigid plate 11. According to actual requirements of products, the width of the second rigid plate 12 can be flexibly selected, to avoid material waste and improve overall utilization rate of the second rigid plate 12 while satisfying connection strength requirements.

In one embodiment, the first intermediate portion 112 of the first rigid plate 11 is spaced apart from the second intermediate portion 122 of the second rigid plate 12 to form a buffer gap 99 therebetween. A central region of the second rigid plate 12 is mainly used to withstand the expansion deformation force from the unit cells. In the case that the second rigid plate 12 is subjected to the expansion deformation force from the unit cells, the central region of the second rigid plate 12 has a larger amount of deformation compared to an outer peripheral region thereof. In the case that the central region of the second rigid plate 12 deforms, the central region compresses the buffer gap 99, so that the amount of deformation of the central region is absorbed by the buffer gap 99. As a result, the central region of the second rigid plate 12 will not come into contact with the first intermediate portion 112 of the first rigid plate 11, and the deformation of the central region of the second rigid plate 12 will not cause a deformation of the first intermediate portion 112 of the first rigid plate 11, and thus a surface of the composite end plate 1 as a whole facing away from the unit cells will not displace or deform away from the unit cells.

Optionally, the first intermediate portion 112 of the first rigid plate 11 is provided with a recess on a surface facing the second rigid plate 12. The recess extends across the entire first rigid plate 11 in the width direction Z, so that the buffer gap 99 is formed between the first intermediate portion 112 and the second intermediate portion 122. As a result, in the case that the second rigid plate 12 is disposed adjacent to the unit cells, the second intermediate portion 122 of the second rigid board 12 can be formed as a flat plate, and a flatness of a surface of the second intermediate portion 122 contact with the unit cells can be ensured, avoiding an excessive stress from being applied to the unit cells locally by the second intermediate portion 122 to cause deformation of unit cell cases, and also reducing a difficulty in processing the second rigid plate 12.

Optionally, it is easy to understand that the expansion deformation force from the unit cells also can be counteract even if the first rigid plate 11 is disposed adjacent to the unit cells.

In one example, the first rigid plate 11 is made of aluminum. The second rigid plate 12 is made of steel. In the case that the second rigid plate 12 is disposed adjacent to the unit cells, the second rigid plate 12 is easily deformed to absorb the expansion force, and the expansion force is prevented from directly acting on the first rigid plate 11, and thus the first rigid plate 11 will not deform. In the case that the first rigid plate 11 is disposed adjacent to the unit cells, the first rigid plate 11 is more rigid and tends not to deform under the act of the expansion force from the unit cells, and thus the second rigid plate 12 will not deform, ensuring that an overall length of the battery module will not be elongated.

In one embodiment, the length of the first rigid plate 11 and the length of the second rigid plate 12 are equal. In the length direction Y of the first rigid plate 11, the first free end 121 of the second rigid plate 12 is aligned with the first end portion 111, and the second free end 123 of the second rigid plate 12 is aligned with the second end portion 113. In the present embodiment, the first free end 121 and the second free end 123 of the second rigid plate 12 can be fixedly connected with the first end portion 111 and the second end portion 113 of the first rigid plate 11 respectively, by using screws or rivets.

In one embodiment, the length of the second rigid plate 12 is greater than the length of the first rigid plate 11. The first free end 121 of the second rigid plate 12 is folded from a side the same with the first surface 11*a* of the first rigid plate 11 to a side the same with the second surface 11*b* and encloses the first end portion 111 of the first rigid plate 11. The second free end 123 of the second rigid plate 12 is folded from the side the same with the first surface 11*a* of the first rigid plate 11 to the side the same with the second surface 11*b* and encloses the second end portion 113 of the first rigid plate 11. A surface of the first free end 121 on the side the same with the second surface 11*b* is fixedly connected with one of the side plates 2. A surface of the second free end 123 on the side the same with the second surface 11*b* is fixedly connected with the other side plate 2. Thus, a connection strength between the first rigid plate 11 and the second rigid plate 12 can be improved, and meanwhile the fixedly connection between the side plates 2 and the second rigid plate 12 can be easily achieved.

Optionally, each side plate 2 is provided with a flanging portion on each of two opposite ends. The two flanging portions on each side plate 2 are respectively fixedly connected with the first free end 121 of one second rigid plate 12 and the second free end 123 of the other second rigid plate 12. A connection region between the side plate 2 and the first free end 121 and a connection region between the side plate 2 and the second free end 123 are both located on the side the same with the second surface 11*b* side of the first rigid plate 11. As a result, in the case that the unit cells expand and deform, the side plates 2 can apply a compressive stress to the composite end plate 1 and the unit cells opposite to the expansion deformation force from the unit cells via the two flanging portions. In this way, on the one hand, it can be effectively prevented that the expansion deformation force pushes or deforms the composite end plate 1 away from the unit cells, and on the other hand, the tensile stress (along the length direction Y of the first rigid plate 11) acting on the connection regions between the side plates 2 and the second rigid plate 12 can be reduced, avoiding the connection regions between the side plates 2 and the second rigid plate 12 from a fracture failure due to an excessive tensile stress.

Figure 3:
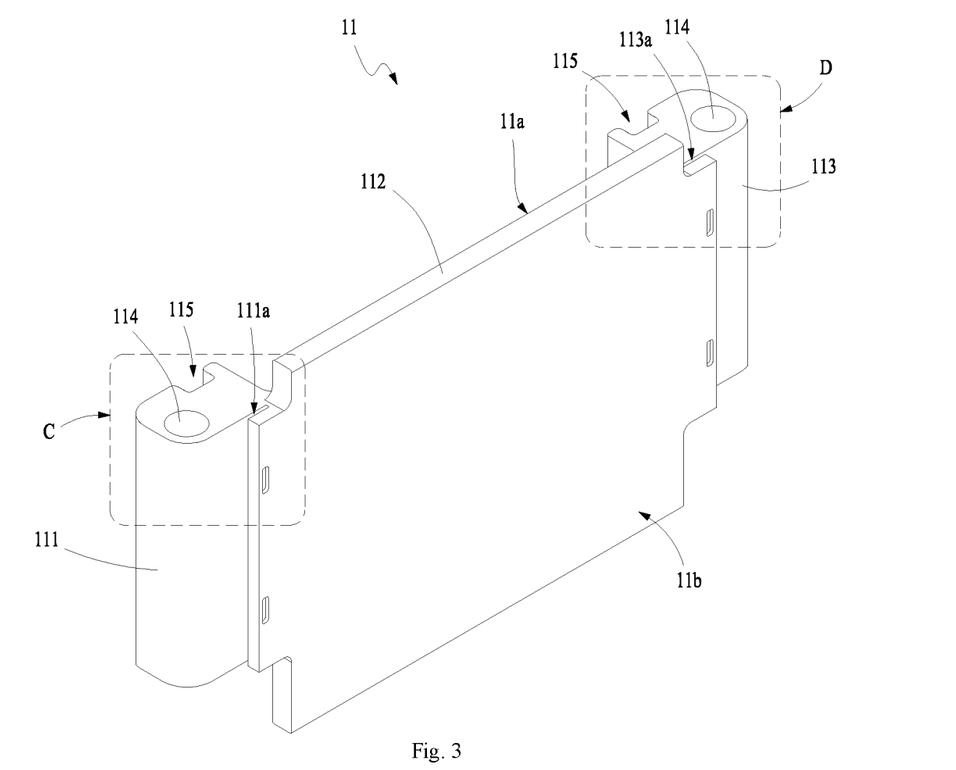
FIG. 3 is a schematic view showing a configuration of a first rigid plate in a perspective view according to one embodiment of the present disclosure.
Figure 4:
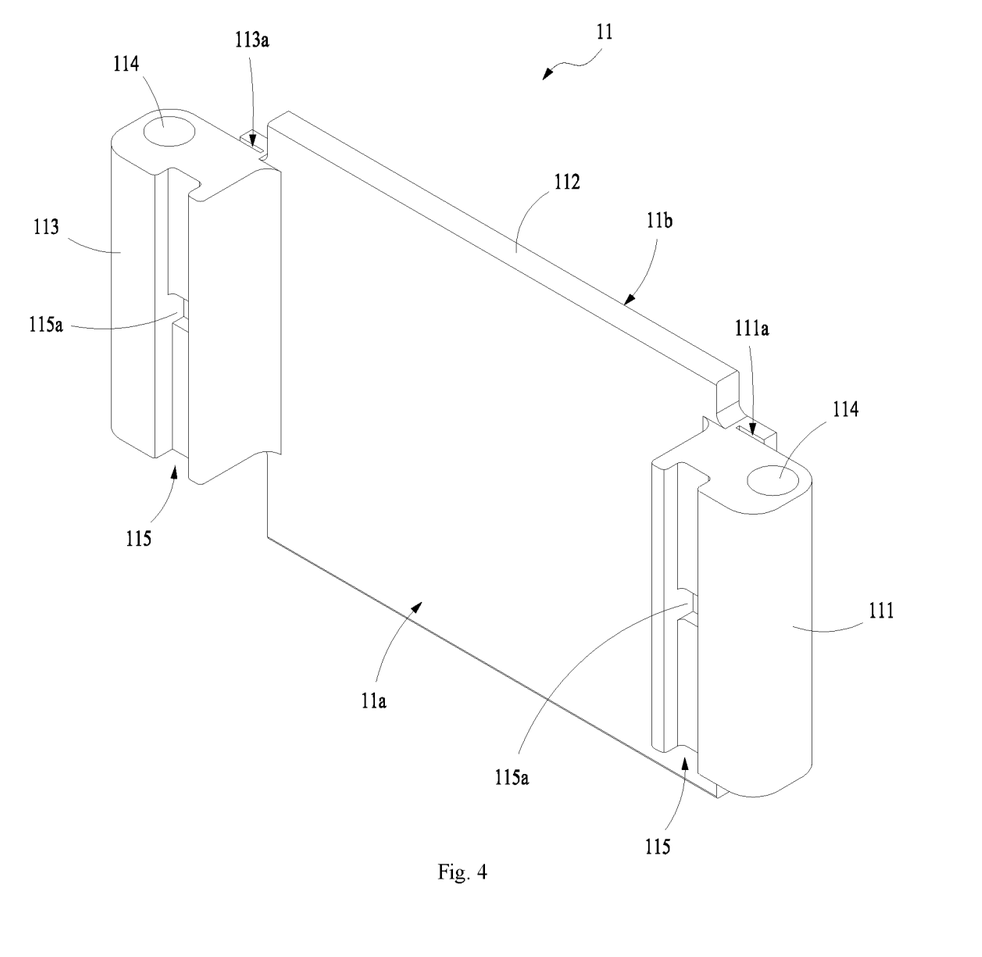
FIG. 4 is a schematic view showing the configuration of the first rigid plate of FIG. 3 in another perspective view.
Figure 5:
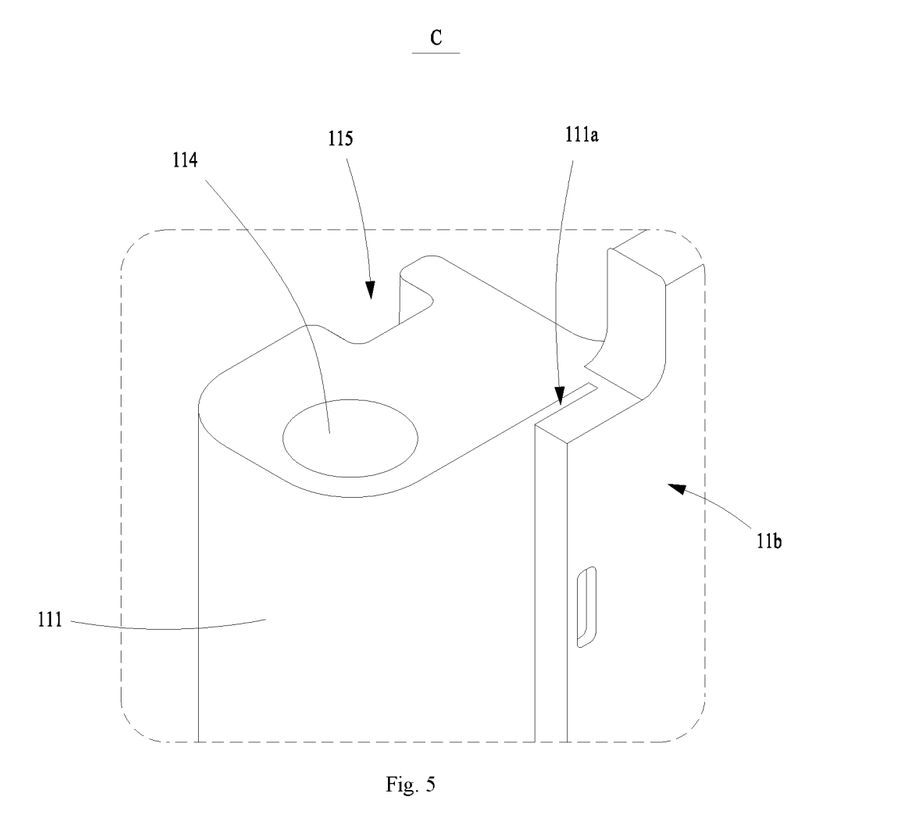
FIG. 5 is a partial enlarged view of portion C in FIG. 3.

As shown in FIG. 3 to FIG. 5, in the present embodiment, the first end portion 111 is provided with a first positioning groove 111*a* on the side the same with the second surface 11*b* for receiving an edge portion of the first free end 121. The first free end 121 is folded to the side the same with the second surface 11*b* and its edge portion is inserted into and connected with the first positioning groove 111*a*. A portion of the first end portion 111 for forming the first positioning groove 111*a* serves as a pressing engagement portion. After the edge portion of the first free end 121 is inserted into the first positioning groove 111*a*, it is covered and pressed by the pressing engagement portion. As a result, the edge portion of the first free end 121 can be limited by the pressing engagement portion, so that even when an excessive tensile stress is applied to the first free end 121 by the side plate 2, the edge portion of the first free end 121 will not curl away from the first end portion 111 under the tensile stress, ensuring a connection stability between the first free end 121 and the first end portion 111. In one example, the first positioning groove 111 extends across the entire first rigid plate 11 in the width direction Z. The first end portion 111 is further provided with a through hole 114 extending in the width direction Z of the first rigid plate 11. If the battery module needs to be fixed to other components, bolts or screws may be used to penetrate through the through hole 114 to fixedly connect the battery module to the components.

Figure 6:
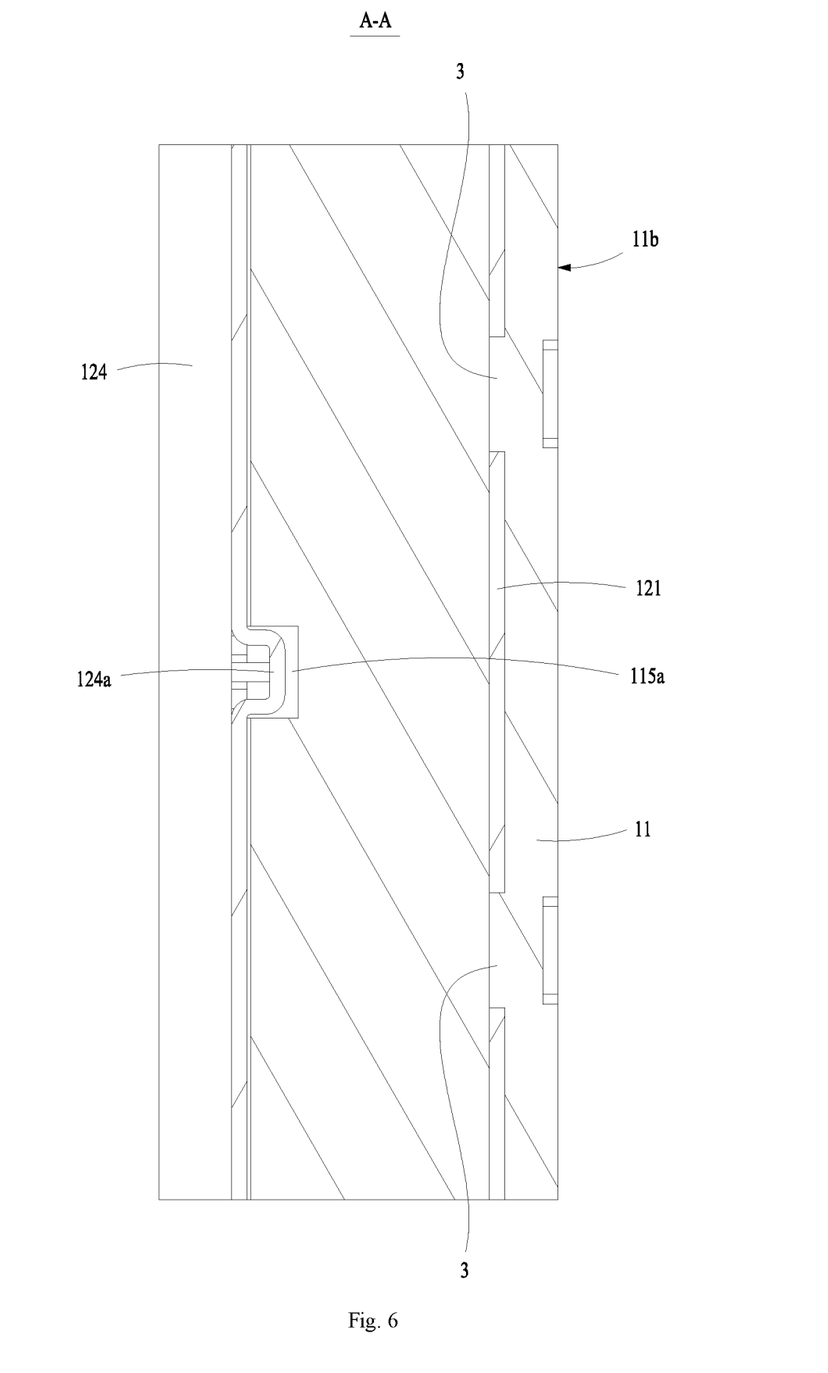
FIG. 6 is an enlarged schematic view of a cross section taken along line A-A of FIG. 2.

As shown in FIG. 6, in the present embodiment, the composite end plate 1 further comprises a first connecting member 3. The first free end 121 is connected with the first end portion 111 by the first connecting member 3. Via the connection of the first free end 121 with the first end portion 111 through the first connecting member 3, the connection strength between the first free end 121 and the first end portion 111 can be further increased, so that in the state that the side plate 2 made of steel is fixedly connected with the first free end 121 of the second rigid plate 12, the first free end 121 tends not to be disconnected from the first end portion 111 even subjected to the tensile stress from the side plate 2.

Figure 7:
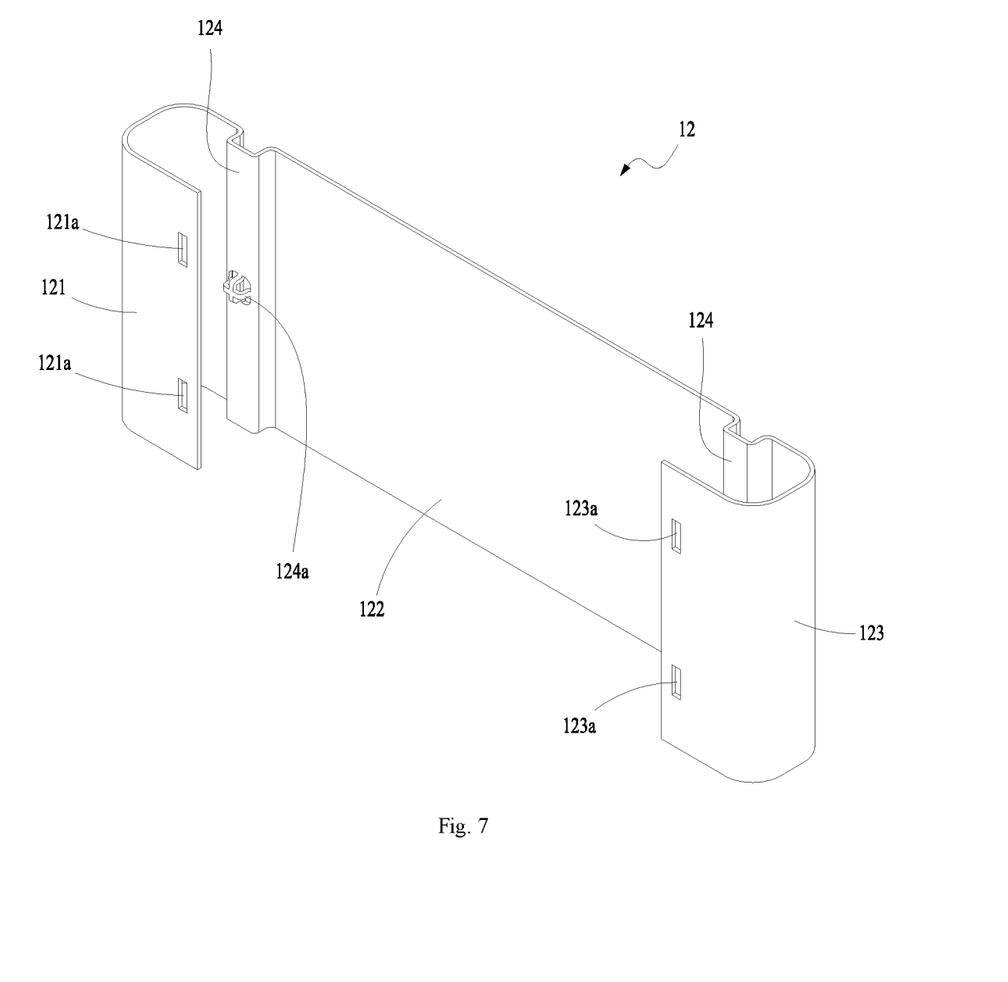
FIG. 7 is a schematic view showing a configuration of a second rigid plate according to one embodiment of the present disclosure.

Optionally, as shown in FIG. 7, in the present embodiment, the edge portion of the first free end 121 is provided with a first positioning hole 121*a* and the first connecting member 3 is formed as a first positioning post. A portion of the first positioning post is inserted into the first positioning hole 121*a* to fixedly connect the first free end 121 and the first end portion 111 with each other. In one example, a portion of the first end portion 111 for forming the first positioning groove 111*a* and for pressing against and connecting with the edge portion of the first free end 121, serves as a pressing engagement portion. The pressing engagement portion is provided with a through hole corresponding to the first positioning hole 121a, and the first positioning post can penetrate through the through hole provided in the pressing engagement portion and the first positioning hole 121a to fixedly connect the first free end 121 with the first end portion 111. In another example, a portion of the pressing engagement portion protrudes toward the first positioning groove 111a, forming the first positioning post. After the first free end 121 is inserted into the first positioning groove 111a, the pressing engagement portion can be punched such that a region of the pressing engagement portion corresponding to the first positioning hole 121a protrudes toward the first positioning groove 111a to form the first positioning post. In the present embodiment, the first positioning post and the first end portion 111 are integrally formed with each other and thus a high connection strength can be achieved therebetween, which can ensure the connection reliability and stability between the first free end 121 and the first end portion 111, and can withstand a larger tensile stress.

Figure 8:
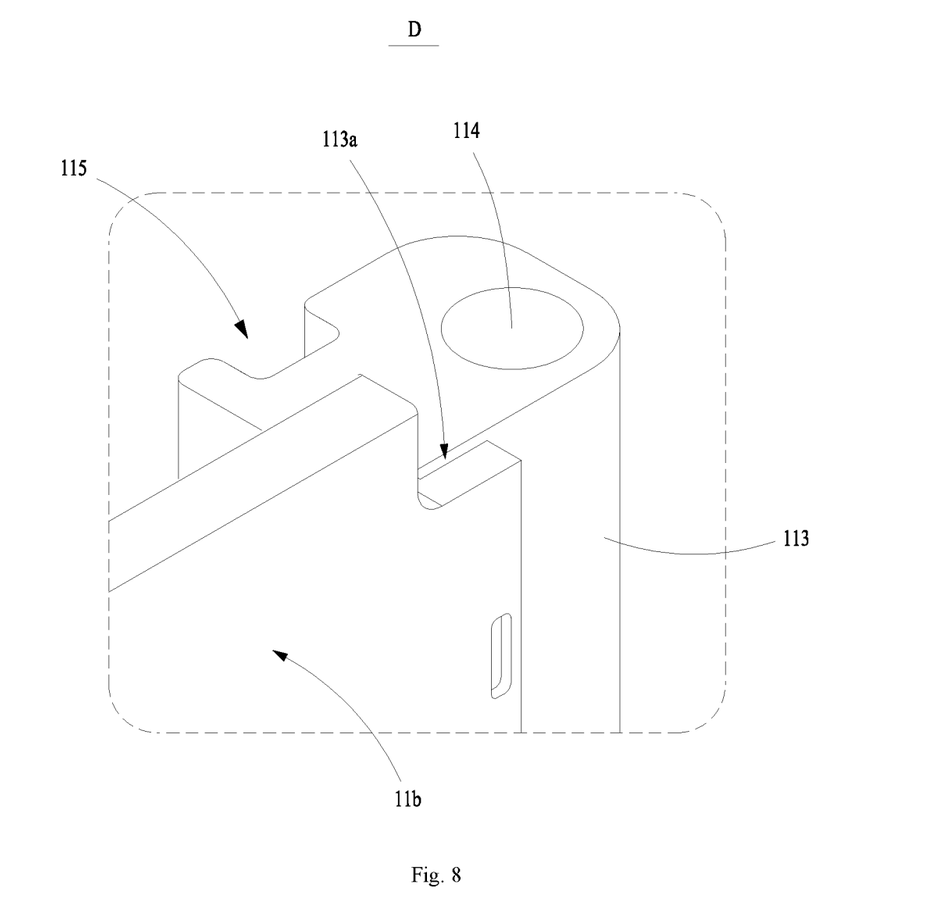
FIG. 8 is a partial enlarged view of portion D in FIG. 3.

As shown in FIG. 3 and FIG. 8, in the present embodiment, the second end portion 113 is provided with a second positioning groove 113a on the side the same with the second surface 11b for receiving an edge portion of the second free end 123. The second free end 123 is folded to the side the same with the second surface 11b and its edge portion is inserted into and connected with the second positioning groove 113a. A portion of the second end portion 113 for forming the second positioning groove 113a serves as a pressing engagement portion. After the edge portion of the second free end 123 is inserted into the second positioning groove 113a, it is covered and pressed by the pressing engagement portion. As a result, the edge portion of the second free end 123 can be limited by the pressing engagement portion, so that even when an excessive tensile stress is applied to the second free end 123 by the side plate 2, the edge portion of the second free end 123 will not curl away from the second end portion 113 under the tensile stress, ensuring a connection stability between the second free end 123 and the second end portion 113. In one example, the second positioning groove 113a extends across the entire first rigid plate 11 in the width direction Z. The second end portion 113 is further provided with a through hole 114 extending in the width direction Z of the first rigid plate 11. If the battery module needs to be fixed to other components, bolts or screws may be used to penetrate through the through hole 114 to fixedly connect the battery module to the components.

Figure 9:
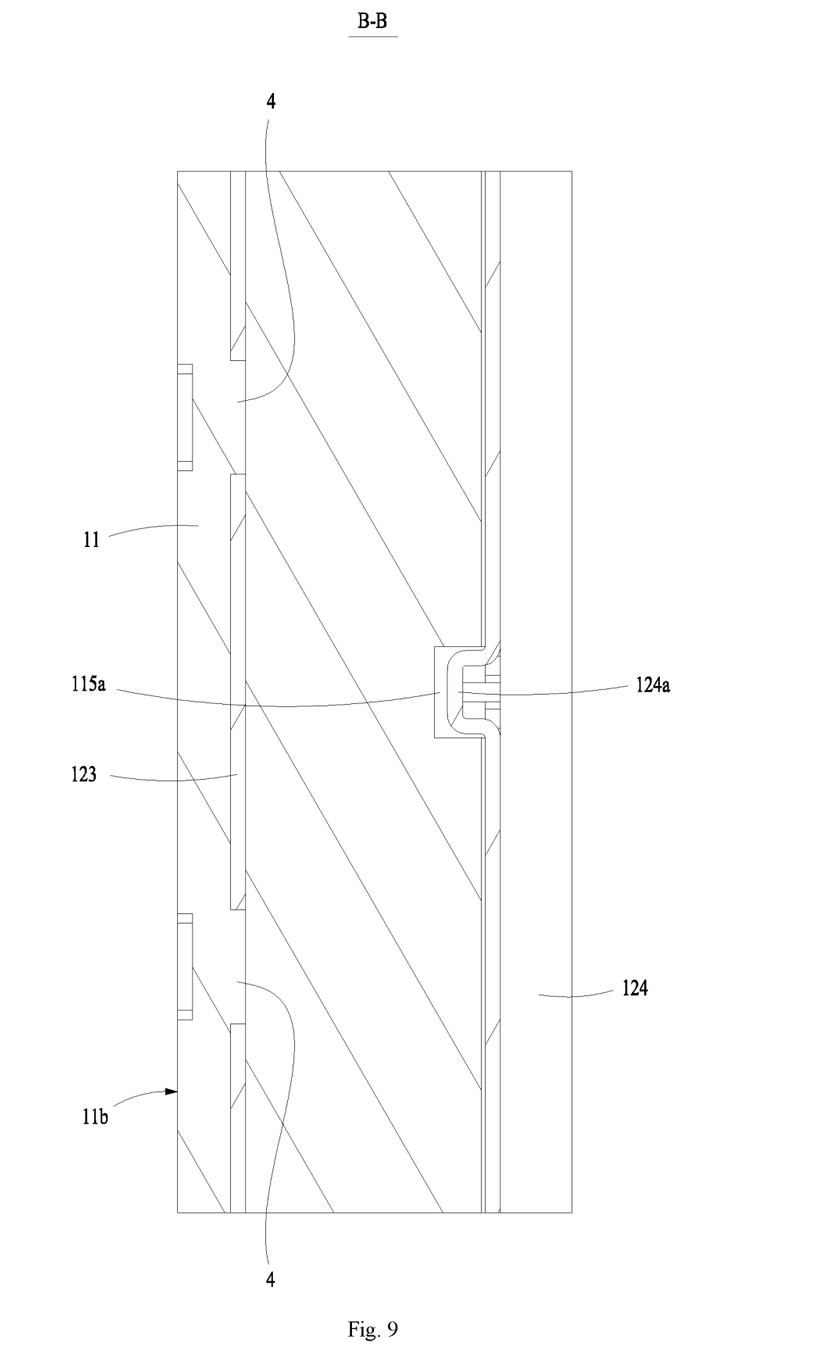
FIG. 9 is an enlarged schematic view of the cross section taken along line B-B of FIG. 2.

As shown in FIG. 9, in the present embodiment, the composite end plate 1 further comprises a second connecting member 4. The second free end 123 is connected with the second end portion 113 by the second connecting member 4. Via the connection of the second free end 123 with the second end portion 113 through the second connecting member 4, the connection strength between the second free end 123 and the second end portion 113 can be further increased, so that in the state that the side plate 2 made of steel is fixedly connected with the second free end 123 of the second rigid plate 12, the second free end 123 tends not to be disconnected from the second end portion 113 even subjected to the tensile stress from the side plate 2.

Optionally, as shown in FIG. 7, in the present embodiment, the edge portion of the second free end 123 is provided with a second positioning hole 123a and the second connecting member 4 is formed as a second positioning post. A portion of the second positioning post is inserted into the second positioning hole 123a to fixedly connect the second free end 123 and the second end portion 113 with each other. In one example, a portion of the second end portion 113 for forming the second positioning groove 113a and for pressing against and connecting with the edge portion of the second free end 123, serves as a pressing engagement portion. The pressing engagement portion is provided with a through hole corresponding to the second positioning hole 123a, and the second positioning post can penetrate through the through hole provided in the pressing engagement portion and the second positioning hole 123a to fixedly connect the second free end 123 with the second end portion 113. In another example, a portion of the pressing engagement portion protrudes toward the second positioning groove 113a, forming the second positioning post. After the second free end 123 is inserted into the second positioning groove 113a, the pressing engagement portion can be punched such that a region of the pressing engagement portion corresponding to the second positioning hole 123a protrudes toward the second positioning groove 113a to form the second positioning post. In the present embodiment, the second positioning post and the second end portion 113 are integrally formed with each other and thus a high connection strength can be achieved therebetween, which can ensure the connection reliability and stability between the second free end 123 and the second end portion 113, and can withstand a larger tensile stress.

Optionally, both the first end portion 111 of the first rigid plate 11 and the first free end 121 of the second rigid plate 12, and the second end portion 113 of the first rigid plate 11 and the second free end 123 of the second rigid plate 12 are fixedly connected by the above described connection manner.

Optionally, the first end portion 111 of the first rigid plate 11 and the first free end 121 of the second rigid plate 12 are fixedly connected by the above described connection manner, while the second end portion 113 of the first rigid plate 11 and the second free end 123 of the second rigid plate 12 are fixedly connected by a screw or rivet.

Optionally, the second end portion 113 of the first rigid plate 11 and the second free end 123 of the second rigid plate 12 are fixedly connected by the above described connection manner, while the first end portion 111 of the first rigid plate 11 and the first free end 121 of the second rigid plate 12 are fixedly connected by a screw or rivet.

In one example, the first end portion 111 of the first rigid plate 11 is provided with a first positioning groove 111a, and the second end portion 113 of the first rigid plate 11 is provided with a second positioning groove 113a. The second rigid plate 12 as a whole can be inserted with respect to and mated with the first rigid plate 11 along the width direction Z of the first rigid plate 11. During this process, the first free end 121 of the second rigid plate 12 is gradually inserted into the first positioning groove 111a, while the second free end 123 of the second rigid plate 12 is gradually inserted into the second positioning groove 113a. Thus, it is convenient and fast to assemble the first rigid plate 11 with the second rigid plate 12.

In one embodiment, the composite end plate 1 is provided with a guiding member, which can play a guiding role during the assembly of the first rigid plate 11 with the second rigid plate 12. During the assembly of the first rigid plate 11 with the second rigid plate 12 in an insertion manner, the second rigid plate 12 can be assembled accurately and quickly with the first rigid plate 11 under the guidance of the guiding member, thereby improving the assembly accuracy and efficiency of the two plates.

Optionally, in the present embodiment, the guiding member is formed of a guiding groove and a guiding rib extending in the width direction Z of the first rigid plate 11. One of the guiding groove and the guiding rib is disposed on the first rigid plate 11 while the other one is disposed on the second rigid plate 12.

For ease of understanding, the present disclosure is described by use of the following embodiment, wherein the first rigid plate 11 is provided with a guiding groove 115, and the second rigid plate 12 is provided with a guiding rib 124, as shown in FIG. 4 and FIG. 7.

The guiding groove 115 and the first rigid plate 11 may be formed separately. The guiding groove 115 is separately processed and manufactured and then fixedly connected to the first rigid plate 11. Alternatively, the guiding groove 115 and the first rigid plate 11 are formed integrally, that is, the guiding groove 115 is directly formed on the first rigid plate 11. The guiding rib 124 and the second rigid plate 12 may be formed separately. The guiding rib 124 is separately processed and manufactured, and then fixedly connected to the second rigid plate 12. Alternatively, the guiding rib 124 and the second rigid plate 12 are formed integrally, that is, the guiding rib 124 is directly formed on the second rigid plate 12.

In one embodiment, the first free end 121 of the second rigid plate 12 is folded such that the edge portion of the first free end 121 is opposite to and spaced apart from the guiding rib 124 at a predetermined distance, and the second free end 123 of the second rigid plate 12 is folded such that the edge portion of the second free end 123 is opposite to and spaced apart from the guiding rib 124 at a predetermined distance.

When assembling the first rigid plate 11 with the second rigid plate 12, at first, the guiding rib 124 on the second rigid plate 12 is aligned with the guiding groove 115 on the first rigid plate 11. Then, the second rigid plate 12 is pushed to move along the width direction Z of the first rigid plate 11, and during this process, the guiding rib 124 is gradually inserted into the guiding groove 115. Due to the limitation of the guiding rib 124 and the guiding groove 115, the relative positions of the second rigid plate 12 and the first rigid plate 11 in the length direction Y of the first rigid plate 11 are no longer changed, and the second rigid plate 12 only can move along the width direction Z of the first rigid plate 11, which is conducive to improve the assembly efficiency of the first rigid plate 11 with the second rigid plate 12. Optionally, the guiding rib 124 on the second rigid plate 12 is in interference fit with the guiding groove 115 on the first rigid plate 11.

Further, after the first rigid plate 11 and the second rigid plate 12 are assembled together, in the case that two side plates 2 opposite to each other respectively apply tensile stresses to the first free end 121 and the second free end 123 of the second rigid plate 12, the second rigid plate 2 tends not to change its position due to the engagement of the guiding rib 124 of the second rigid plate 12 with the guiding groove 115 of the first rigid plate 11. Thus, the movement of the second rigid plate 12 in the length direction Y of the first rigid plate 11, and thus unbalance of the tensile stresses on the first free end 121 and the second free end 123, can be prevented.

It is easy to understand that an embodiment in which the guiding rib 124 is disposed on the first rigid plate 11 and the guiding groove 115 is disposed on the second rigid plate 12, is similar to the above-described embodiment, and details thereof will not be described herein again.

Optionally, referring to FIG. 5 and FIG. 7, the guiding groove 115 includes a bottom surface and a positioning recess 115*a* provided on the bottom surface. The guiding rib 124 includes a top surface and a positioning protrusion 124*a* provided on the top surface. At least a portion of the positioning protrusion 124*a* is inserted into the positioning recess 115*a*. Referring to FIG. 6 and FIG. 9, when the second rigid plate 12 is moved to a predetermined position relative to the first rigid plate 11 in the width direction Z of the first rigid plate 11, the positioning protrusion 124*a* on the guiding rib 124 can be inserted into the positioning recess 115*a* in the guide groove 115, so as to lock the second rigid plate 12 relative to the first rigid plate 11 and prevent the second rigid plate 12 from continuing to move. This can improve the assembly accuracy and assembly efficiency of the first rigid plate 11 with the second rigid plate 12.

Further, the positioning recess 115*a* has a cross section of a polygon, and outer peripheral surfaces of the portion of the positioning protrusion 124*a* inserted into the positioning recess 115*a* are in contact with inner wall surfaces of the positioning recess 115*a*. Thus, the positioning protrusion 124*a* is limited by the positioning recess 115*a* in all directions parallel to the first rigid plate 11, so that the second rigid plate 12 will not move in any direction parallel to the first rigid plate 11, when subjected to the tensile stress applied by the side plates 2 or the expansion deformation force from the unit cells. This can improve a relative positional stability of the second rigid plate 12 and the first rigid plate 11.

Furthermore, the guiding members are disposed both between the first free end 121 and the first end portion 111 and between the second free end 123 and the second end portion 113. Thus, during the assembly of the second rigid plate 12 with the first rigid plate 11, the guiding member disposed between the first free end 121 and the first end portion 111 and the guiding member disposed between the second free end 123 and the second end portion 113 can limit the second rigid plate 12 cooperatively, which can improve the assembly accuracy and assembly efficiency of the second rigid plate 12.

The composite end plate 1 according to the embodiments of the present disclosure comprises a first rigid plate 11 and a second rigid plate 12 made of different materials. When the composite end plate 1 is applied to the battery module, the second rigid plate 12 is used to fixedly connect with the side plate 2. The second rigid plate 12 and the side plate 2 are made of the same material and can be joined to each other by welding. As a result, a weld joint between the second rigid plate 12 and the side plate 2 has a high strength and an improved tensile stress resistance, so that the composite end plate 1 can withstand a larger expansion deformation force from the unit cells, and a structural reliability of the battery module as a whole can be improved. Further, the material of the first rigid plate 11 can be flexibly selected according to actual production requirements, and a high adaptive capacity can be obtained.

The embodiments of the present disclosure further provides a battery module comprising a plurality of unit cells and a fixing frame. The plurality of unit cells are arranged side by side in one direction. The fixing frame is arranged to surround an outer periphery of all the unit cells to fix the plurality of unit cells. The fixing frame comprises two side plates 2 and two composite end plates 1 according to the above-described embodiments. The composite end plates 1 and the side plates 2 are alternately arranged around the unit cells. Two opposite ends of one side plate 2 are respectively connected with a first free end 121 of one second rigid plate 12 and a second free end 123 of the other second rigid plate 12, and two opposite ends of the other side plate 2 are respectively connected with the first free end 121 of the other second rigid plate 12 and the second free end 123 of the one second rigid plate 12. The side plate 2 and the second rigid plate 12 are made of the same material.

Optionally, both of the side plate 2 and the second rigid plate 12 are made of steel. Preferably, the side plate 2 and the second rigid plate 12 are made of stainless steel, and the second rigid plate 12 and the side plate 2 can be fixedly connected with each other by welding. As a result, the weld joint between the second rigid plate 12 and the side plate 2 has a high strength and thus can withstand a larger expansion deformation force due to expansion of the unit cells, effectively reducing a displacement or deformation amount of the composite end plate 1 away from the unit cells and improving structural reliability of the battery module as a whole.

The unit cell in the above embodiments may be a prismatic cell. The prismatic cell has two side surfaces of a larger area and two side surfaces of a smaller area. When a plurality of prismatic cells are arranged, the side surfaces of the larger area of two adjacent unit cells are disposed opposite to each other.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A battery module, characterized in that, comprising:
a plurality of unit cells arranged side by side;
a fixing frame, arranged to surround an outer periphery of all the unit cells and comprising two composite end plates and two side plates, wherein the composite end plates and the side plates are alternately arranged around the plurality of the unit cells and are connected to each other,
wherein each of the two composite end plates comprises:
a first rigid plate having a first surface and a second surface opposite to each other in a thickness direction of the first rigid plate, and comprising a first end portion, a first intermediate portion and a second end portion continuously distributed in a length direction of the first rigid plate; and
a second rigid plate comprising a first free end, a second intermediate portion and a second free end continuously distributed in the length direction,
wherein the first rigid plate and the second rigid plate are made of different materials, the first rigid plate is made of a metal material or a non-metal material, and the second rigid plate is made of a metal material; the first rigid plate and the second rigid plate are arranged side by side in the thickness direction of the first rigid plate with the second intermediate portion of the second rigid plate facing the first surface of the first rigid plate, the first free end of the second rigid plate is connected to the first end portion of the first rigid plate, and the second free end of the second rigid plate is connected to the second end portion of the first rigid plate,
the first free end of the second rigid plate is folded from a side the same with the first surface of the first rigid plate to a side the same with the second surface of the first rigid plate to enclose the first end portion of the first rigid plate, and the second free end of the second rigid plate is folded from a side the same with the first surface of the first rigid plate to a side the same with the second surface of the first rigid plate to enclose the second end portion of the first rigid plate, and
each of the two side plates is made of the same material as the second rigid plate, and the two side plates are connected to the second rigid plates by welding.

2. The battery module of claim 1, wherein each of the two composite end plates is characterized in that,
the first intermediate portion of the first rigid plate and the second intermediate portion of the second rigid plate are spaced apart from each other with a buffer gap formed therebetween.

3. The battery module of claim 1, wherein each of the two composite end plates is characterized in that,
the first end portion of the first rigid plate is provided with a first positioning groove on the same side with the second surface, and the first positioning groove is adapted to receive an edge portion of the first free end of the second rigid plate; and
each of the two composite end plates is provided with a first connecting member, through which the first free end of the second rigid plate is connected to the first end portion of the first rigid plate.

4. The battery module of claim 3, wherein each of the two composite end plates is characterized in that,
the edge portion of the first free end of the second rigid plate is provided with a first positioning hole, and the first connecting member is formed as a first positioning post, wherein a portion of the first positioning post is inserted into the first positioning hole to fixedly connect the first free end of the second rigid plate and the first end portion of the first rigid plate to each other; and
the first positioning post is formed by a portion of the first end portion of the first rigid plate that protrudes towards the first positioning groove.

5. The battery module of claim 1, wherein each of the two composite end plates is characterized in that,
the second end portion of the first rigid plate is provided with a second positioning groove on the same side with the second surface and the second positioning groove is adapted to receive an edge portion of the second free end of the second rigid plate; and
each of the two composite end plates is provided with a second connecting member, through which the second free end of the second rigid plate is connected to the second end portion of the first rigid plate.

6. The battery module of claim 5, wherein each of the two composite end plates is characterized in that,
the edge portion of the second free end of the second rigid plate is provided with a second positioning hole, and the second connecting member is formed as a second positioning post, wherein a portion of the second positioning post is inserted into the second positioning hole to fixedly connect the second free end of the second rigid plate and the second end portion of the first rigid plate to each other; and
the second positioning post is formed by a portion of the second end portion of the first rigid plate that protrudes towards the second positioning groove.

7. The battery module of claim 1, wherein
each of the two composite end plates is provided with a guiding member
formed of a guiding groove and a guiding rib extending in a width direction of the first rigid plate, the guiding groove is provided on the first rigid plate and the guiding rib is provided on the second rigid plate.

8. The battery module of claim 7, wherein each of the two composite end plates is characterized in that,
   the guiding groove comprises a bottom surface and a positioning recess provided on the bottom surface, and the guiding rib comprises a top surface and a positioning protrusion provided on the top surface, wherein at least a portion of the positioning protrusion is inserted into the positioning recess, and
   the positioning recess has a polygonal cross portion, and outer peripheral surfaces of the portion of the positioning protrusion inserted into the positioning recess are contact with inner wall surfaces of the positioning recess.

9. The battery module of claim 7, wherein each of the two composite end plates is characterized in that,
   a guiding member is disposed between the first free end of the second rigid plate and the first end portion of the first rigid plate, and a guiding member is disposed between the second free end of the second rigid plate and the second end portion of the first rigid plate.

* * * * *